(12) United States Patent
Yang

(10) Patent No.: US 11,178,680 B2
(45) Date of Patent: Nov. 16, 2021

(54) METHOD, APPARATUS, AND SYSTEM FOR ACQUIRING SYSTEM INFORMATION

(71) Applicant: GUANGDONG OPPO MOBILE TELECOMMUNICATIONS CORP., LTD., Guangdong (CN)

(72) Inventor: Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 23 days.

(21) Appl. No.: 16/568,618

(22) Filed: Sep. 12, 2019

(65) Prior Publication Data

US 2020/0008223 A1  Jan. 2, 2020

Related U.S. Application Data

(63) Continuation of application No. PCT/CN2017/076995, filed on Mar. 16, 2017.

(51) Int. Cl.
*H04W 74/08* (2009.01)
*H04W 72/04* (2009.01)
(Continued)

(52) U.S. Cl.
CPC ... *H04W 72/1268* (2013.01); *H04W 72/1289* (2013.01)

(58) Field of Classification Search
CPC ......... H04W 72/1278; H04W 72/1268; H04W 72/1289
See application file for complete search history.

(56) References Cited

U.S. PATENT DOCUMENTS 10,524,283 B2 * 12/2019 Webb ................ H04W 72/1268
2017/0251500 A1 * 8/2017 Agiwal ................ H04W 48/12
2018/0192410 A1 7/2018 Liu

FOREIGN PATENT DOCUMENTS

CN 101959287 A 1/2011
CN 102111855 A 6/2011
(Continued)

OTHER PUBLICATIONS

The EESR of corresponding European application No. 17900829.7, dated Feb. 14, 2020.
(Continued)

*Primary Examiner* — Gary Lafontant

(57) ABSTRACT

The present application relating to the field of application of communication technologies provides a method, an apparatus and a system for acquiring system information. The method includes: a terminal transmits a system information request to a base station; and the terminal receives a system information request response transmitted by the base station, where the system information request response includes system information or transmission indication information of the system information; where the transmission indication information is used to indicate that the terminal acquires, based on the transmission indication information, the system information transmitted by the base station. In the present application, redundant transmission of unnecessary information can be avoided and waste of communication resources can be reduced. The present application is used for acquiring system information in a mobile communication system.

10 Claims, 9 Drawing Sheets

(51) Int. Cl.
  *H04W 72/14* (2009.01)
  *H04W 4/06* (2009.01)
  *H04W 72/12* (2009.01)

(56) References Cited

FOREIGN PATENT DOCUMENTS

| CN | 103179513 A | 6/2013 |
|---|---|---|
| CN | 105208635 A | 12/2015 |
| CN | 106341896 A | 1/2017 |
| RU | 2374790 C2 | 11/2009 |
| RU | 2433573 C2 | 11/2011 |
| RU | 2440675 C2 | 1/2012 |
| WO | 2008044664 A1 | 4/2008 |
| WO | 2014/150133 A1 | 9/2014 |

OTHER PUBLICATIONS

Samsung: "On Demand SI Delivery: Signaling Aspects", 3GPP Draft; R2-1700011 on Demand SI Delivery Signaling Aspects, 3rd Generation Partnership Project (3GPP), Mobile Competence Centre; 650, Route Des Lucioles; F-06921 Sophia-Antipolis Cedex, France, vol. RAN WG2, No. Spokane, USA; Jan. 17, 2017-Jan. 19, 2017 Jan. 17, 2017(Jan. 17, 2017, XP051210599.

Zte et al: "Consideration on the Other SI delivery in NR", 3GPP Draft; R2-166343 Consideration on the Other SI delivery in NR, 3rd Generation Partnership Project (3GPP), Mobile Competence Centre; 650, Route Des Lucioles; F-06921 Sophia-Antipolis Cedex; FRA, vol. RAN WG2, No. Kaohsiung; Oct. 10, 2016-Oct. 14, 2016 Oct. 9, 2016(Oct. 9, 2016), XP051150915.

Samsung: "On Demand SI Delivery: Signaling Aspects", 3GPP Draft; R2-167563 On Demand SI Delivery Signaling Aspects, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 14, 2016-Nov. 18, 2016 Nov. 13, 2016(Nov. 13, 2016), XP051177431.

The first Office Action of corresponding Russian application No. 2019130861, dated May 21, 2020.

Samsung. 3GPP TSG-RAN WG2 Meeting # 97; R2-1700817(Update of R2-1700011); On Demand SI Request Transmission Mechanism Athens, Greece, Feb. 13-17, 2017.

LG Electronics Inc. 3GPP TSG-RAN WG2 Meeting #97 R2-1701260; MSG1 vs MSG3 Athens, Greece, Feb. 13-Feb. 17, 2017.

CATT. 3GPP TSG-RAN WG2 #97 R2-1701490; On-demand SI Request Transmission,Athens, Greece, Feb. 13-17, 2017.

The first Office Action of corresponding Canadian application No. 3056470, dated Nov. 3, 2020.

The first Office Action of corresponding European application No. 17900829.7, dated Nov. 11, 2020.

NEC: "LTE BCH-on-demand", 3GPP Draft; R2-062930 LTE BCH on Demand, 3rd Generation Partnership Project (3GPP), Mobile Competence Centre; 650, Route Des Lucioles; F-06921 Sophia-Antipolis Cedex; France, vol. RAN WG2, No. Seoul, Korea; Oct. 5, 2006, Oct. 5, 2006(Oct. 5, 2006) XP05132448.

The first Office Action of corresponding Singaporean application No. 11201908506P, dated Mar. 11, 2021.

The first Office Action of corresponding Taiwan application No. 107105091, dated Mar. 30, 2021.

The first Office Action of corresponding Indian application No. 201917039771, dated Apr. 12, 2021.

The second Office Action of corresponding Canadian application No. 3056470, dated Aug. 27, 2021.

* cited by examiner

METHOD, APPARATUS, AND SYSTEM FOR ACQUIRING SYSTEM INFORMATION

CROSS-REFERENCE TO RELATED APPLICATIONS

This application is a continuation of International Application No. PCT/CN2017/076995, filed on Mar. 16, 2017, which is hereby incorporated by reference in its entirety.

TECHNICAL FIELD

The present disclosure relates to the field of application of communication technologies and, in particular, to a method, an apparatus, and a system for acquiring system information.

BACKGROUND

With rapid development of the field of mobile communication, the mobile Internet and the Internet of Things have become two main driving forces for mobile communications in the future, and provide a broad application scenario for the 5th-generation mobile communication technologies (5G for short). System information (SI for short) in a 5G system can be transmitted at a frequency having a range up to 100 GHz (gigahertz). For such a high-frequency network, data transmission between a base station and a terminal (also known as user equipment (UE for short)) needs to be performed by means of beamforming to meet requirements on channel quality during the high-band data transmission process. However, one problem for the data transmission by means of beamforming is how to provide system information.

The system information can be transmitted by a master information block (MIB for short) and more than one system information block (SIB for short). In the related art, system information of a Long Term Evolution (LTE for short) network is transmitted by a base station through omnidirectional broadcasting. Both the SIB and MIB have a fixed transmission period. The SIB includes SIB1 (a core system information block, also known as a minimum system information block) and other SIB (also known as SIBx). Generally, scheduling information of other SIB is carried in SIB1 for broadcasting, where information transmitted by SIB1 includes minimum system information (Minimum SI), and information transmitted by other SIB includes other system information (Other SI).

However, since the current system information is periodically transmitted, it is easy to cause redundant transmission of unnecessary system information, causing waste of communication resources.

SUMMARY

In order to solve the problem that the current system information acquisition process is likely to cause waste of communication resources, the present disclosure provides a method, an apparatus, and a system for acquiring system information. The technical solutions are as follows:

In a first aspect, a method for acquiring system information is provided, including:

transmitting, by a terminal, a system information request to a base station; and receiving, by the terminal, a system information request response transmitted by the base station, where the system information request response includes system information or transmission indication information of the system information;

where the transmission indication information is used to indicate that the terminal acquires, based on the transmission indication information, the system information transmitted by the base station.

In an embodiment, before the receiving, by the terminal, the system information request response transmitted by the base station, further including:

acquiring, by the terminal, a reconfigured transmission parameter of the system information using minimum system information transmitted by the base station, or acquiring, by the terminal, a transmission parameter of the system information using minimum system information transmitted by the base station, or acquiring, by the terminal, a preconfigured transmission parameter of the system information;

the receiving, by the terminal, the system information request response transmitted by the base station includes:

receiving, by the terminal, according to the transmission parameter, the system information request response transmitted by the base station, where the system information request response includes the system information.

In an embodiment, the transmission parameter includes: an effective transmission duration and a transmission period, and the system information request response includes the system information, the receiving, by the terminal, according to the transmission parameter, the system information request response transmitted by the base station includes:

after the system information request is transmitted to the base station, repeatedly performing, by the terminal, an action of receiving the system information according to the transmission period until the system information is successfully received, or the terminal stopping receiving the system information when a receiving duration reaches the effective transmission duration, where the system information is carried in the system information request response transmitted by the base station based on the system information request;

where the receiving duration is a duration of performing the receiving action from a time instance when the system information request is transmitted.

In an embodiment, the system information request response includes the transmission indication information of the system information, after the receiving, by the terminal, the system information request response transmitted by the base station, the method further includes:

acquiring, by the terminal, according to the transmission indication information, the system information transmitted by the base station.

In an embodiment, the transmission indication information is used to indicate that the system information is transmitted based on a transmission parameter of the system information carried in minimum system information, or the transmission indication information is used to indicate that the system information is transmitted based on a preconfigured transmission parameter of the system information, or the transmission indication information is used to indicate a transmission parameter of the system information.

In an embodiment, the transmission parameter includes: an effective transmission duration and a transmission period, the acquiring, by the terminal, according to the transmission indication information, the system information transmitted by the base station includes:

after the system information request response is received, repeatedly performing, by the terminal, an action of receiving the system information according to the transmission period and stopping receiving the system information when the system information is successfully received, or the terminal stopping receiving the system information when a receiving duration reaches the effective transmission duration;

where the receiving duration is a duration of performing the receiving action from a time instance when the system information request response is received.

In an embodiment, after the receiving, by the terminal, the system information request response transmitted by the base station, further including:

retransmitting, by the terminal, the system information request to the base station when the system information cannot be successfully received according to the transmission parameter.

In an embodiment, after the receiving, by the terminal, the system information request response transmitted by the base station, further including:

transmitting, by the terminal, reception feedback information to the base station when the system information is successfully received according to the transmission parameter, where the reception feedback information indicates that the terminal has successfully received the system information.

In an embodiment, the system information request response includes configuration information of the reception feedback information.

In an embodiment, the transmission parameter includes at least one of the following: a transmission manner, a transmission period, a number of transmission times, a transmission start position, an encoding manner, a resource used for transmission, and an effective transmission duration.

In an embodiment, the receiving, by the terminal, the system information request response transmitted by the base station includes:

receiving, by the terminal, feedback information transmitted by the base station for a physical random access resource, where the feedback information carries the system information request response.

In a second aspect, a method for acquiring system information is provided, including:

generating, by a base station, a system information request response according to a system information request transmitted by a terminal, where the system information request response includes system information or transmission indication information of the system information, where the transmission indication information is used to indicate that the terminal acquires, based on the transmission indication information, the system information transmitted by the base station; and transmitting, by the base station, the system information request response to the terminal.

In an embodiment, before the transmitting, by the base station, the system information request response to the terminal, further including:

transmitting, by the base station, minimum system information including a reconfigured transmission parameter of the system information to the terminal, or transmitting, by the base station, minimum system information including a transmission parameter of the system information to the terminal, or acquiring, by the base station, a pre-configured transmission parameter of the system information;

the transmitting, by the base station, the system information request response to the terminal includes:

transmitting, by the base station, the system information request response to the terminal according to the transmission parameter.

In an embodiment, the system information request response includes the transmission indication information of the system information, after the transmitting, by the base station, the system information request response to the terminal, the method further includes:

transmitting, by the base station, the system information to the terminal based on the transmission indication information of the system information.

In an embodiment, the transmission indication information is used to indicate that the system information is transmitted based on the transmission parameter of the system information carried in minimum system information, or the transmission indication information is used to indicate that the system information is transmitted based on the pre-configured transmission parameter of the system information, or the transmission indication information is used to indicate the transmission parameter of the system information.

In an embodiment, after the transmitting, by the base station, the system information request response to the terminal, further including:

receiving, by the base station, reception feedback information transmitted by the terminal, where the reception feedback information indicates that the terminal has successfully received the system information.

In an embodiment, the system information request response includes configuration information of the reception feedback information.

In an embodiment, the transmission parameter includes at least one of the following: a transmission manner, a transmission period, the number of transmission times, a transmission start position, an encoding manner, a resource used for transmission, and an effective transmission duration.

In an embodiment, the transmitting, by the base station, the system information request response to the terminal includes:

transmitting, by the base station, feedback information for a physical random access resource to the terminal, where the feedback information carries the system information request response.

In a third aspect, an apparatus for acquiring system information is provided, including:

a transmitting module, configured to transmit a system information request to a base station; and a receiving module, configured to receive a system information request response transmitted by the base station, where the system information request response includes system information or transmission indication information of the system information;

where the transmission indication information is used to indicate that system information transmitted by the base station is acquired based on the transmission indication information.

In an embodiment, the apparatus further includes:

a parameter acquiring module, configured to: before the system information request response transmitted by the base station is received, acquire a reconfigured transmission parameter of the system information using minimum system information transmitted by the base station, or acquire a transmission parameter of the system information using minimum system information transmitted by the base station, or acquire a t pre-configured transmission parameter of the system information;

the receiving module is specifically configured to:

receive, according to the transmission parameter, the system information request response transmitted by the base station, where the system information request response includes the system information.

In an embodiment, the transmission parameter includes: an effective transmission duration and a transmission period, and the system information request response includes the system information, the receiving module is specifically configured to:

after the system information request is transmitted to the base station, repeatedly perform an action of receiving the system information according to the transmission period until the system information is successfully received, or stop receiving the system information when a receiving duration reaches the effective transmission duration, where the system information is carried in the system information request response transmitted by the base station based on the system information request;

where the receiving duration is a duration of performing the receiving action from a time instance when the system information request is transmitted.

In an embodiment, the system information request response includes the transmission indication information of the system information, and the apparatus further includes:

an information acquiring module, configured to: after the system information request response transmitted by the base station is received, acquire, according to the transmission indication information, the system information transmitted by the base station.

In an embodiment, the transmission indication information is used to indicate that the system information is transmitted based on a transmission parameter of the system information carried in minimum system information, or the transmission indication information is used to indicate that the system information is transmitted based on a pre-configured transmission parameter of the system information, or the transmission indication information is used to indicate a transmission parameter of the system information.

In an embodiment, the transmission parameter includes: an effective transmission duration and a transmission period, and the information acquiring module is specifically configured to:

after the system information request response is received, repeatedly perform an action of receiving the system information according to the transmission period and stop receiving the system information when the system information is successfully received, or stop receiving the system information when a receiving duration reaches the effective transmission duration;

where the receiving duration is a duration of performing the receiving action from a time instance when the system information request response is received.

In an embodiment, the apparatus further includes:

a retransmitting module, configured to: after the system information request response transmitted by the base station is received, retransmit the system information request to the base station when the system information cannot be successfully received according to the transmission parameter.

In an embodiment, the apparatus further includes:

a feedback module, configured to: after the system information request response transmitted by the base station is received, transmit reception feedback information to the base station when the system information is successfully received according to the transmission parameter, where the reception feedback information indicates that the system information has been successfully received.

In an embodiment, the system information request response includes configuration information of the reception feedback information.

In an embodiment, the transmission parameter includes at least one of the following: a transmission manner, a transmission period, a number of transmission times, a transmission start position, an encoding manner, a resource used for transmission, and an effective transmission duration.

In an embodiment, the receiving module is specifically configured to:

receive feedback information transmitted by the base station for a physical random access resource, where the feedback information carries the system information request response.

In a fourth aspect, an apparatus for acquiring system information is provided, including:

a generating module, configured to generate a system information request response according to a system information request transmitted by a terminal, where the system information request response includes system information or transmission indication information of the system information, where the transmission indication information is used to indicate that the terminal acquires, based on the transmission indication information, system information transmitted by a base station; and a transmitting module, configured to transmit the system information request response to the terminal.

In an embodiment, the apparatus further includes:

a preprocessing module, configured to: before the system information request response to the terminal is transmitted, transmit minimum system information including a reconfigured transmission parameter of the system information to the terminal, or transmit minimum system information including a transmission parameter of the system information to the terminal, or acquire a pre-configured transmission parameter of the system information;

the transmitting module is specifically configured to:

transmit the system information request response to the terminal according to the transmission parameter.

In an embodiment, the system information request response includes the transmission indication information of the system information, and the transmitting module is further configured to:

after the system information request response is transmitted to the terminal, transmit the system information to the terminal based on the transmission indication information of the system information.

In an embodiment, the transmission indication information is used to indicate that the system information is transmitted based on the transmission parameter of the system information carried in minimum system information, or the transmission indication information is used to indicate that the system information is transmitted based on the pre-configured transmission parameter of the system information, or the transmission indication information is used to indicate the transmission parameter of the system information.

In an embodiment, the apparatus further includes:

a receiving module, configured to: after the system information request response is transmitted to the terminal, receive reception feedback information transmitted by the terminal, where the reception feedback information indicates that the terminal has successfully receives the system information.

In an embodiment, the system information request response includes configuration information of the reception feedback information.

In an embodiment, the transmission parameter includes at least one of the following: a transmission manner, a transmission period, the number of transmission times, a transmission start position, an encoding manner, a resource used for transmission, and an effective transmission duration.

In an embodiment, the transmitting module is specifically configured to:

transmit feedback information for a physical random access resource to the terminal, where the feedback information carries the system information request response.

In a fifth aspect, a system for acquiring system information is provided, including:

a terminal and a base station, where the terminal includes the apparatus for acquiring the system information according to any one of the third aspect and the possible implementations thereof;

and the base station includes the apparatus for acquiring the system information according to any one of the fourth aspect and the possible implementations thereof.

According to the method, the apparatus, and the system for acquiring system information provided in embodiments of the present disclosure, since the base station can transmit the system information request response carrying the transmission indication information or the system information according to the system information request from the terminal, the terminal can acquire the system information according to the system information request response. Instead of being periodically transmitted, the system information is acquired by the terminal on a targeted basis according to its own needs. Therefore, compared with the prior art, redundant transmission of unnecessary information is avoided, and the waste of communication resources is reduced.

BRIEF DESCRIPTION OF DRAWING(S)

In order to illustrate technical solutions of embodiments of the present disclosure more clearly, accompanying drawings used in description of the embodiments will be briefly described hereunder. Obviously, the described drawings are merely some embodiments of present disclosure. For those of ordinary skill in the art, other drawings may be obtained based on these drawings without any creative effort.

FIG. 1-2 is a schematic diagram of a conventional manner for system information transmission;

FIG. 2 is a schematic flowchart of a method for acquiring system information according to an embodiment of the present disclosure;

FIG. 4-1 to FIG. 4-7 are block diagrams of an apparatus for acquiring system information according to an exemplary embodiment of the present disclosure;

FIG. 5-1 to FIG. 5-3 are block diagrams of an apparatus for acquiring system information according to another exemplary embodiment of the present disclosure; and FIG. 6 is a block diagram of an apparatus for acquiring system information according to still another exemplary embodiment of the present disclosure.

DESCRIPTION OF EMBODIMENTS

In order to make objectives, technical solutions, and advantages of the present disclosure clearer, implementations of the present disclosure will be further described hereunder in detail with reference to the accompanying drawings.

Figure 1:
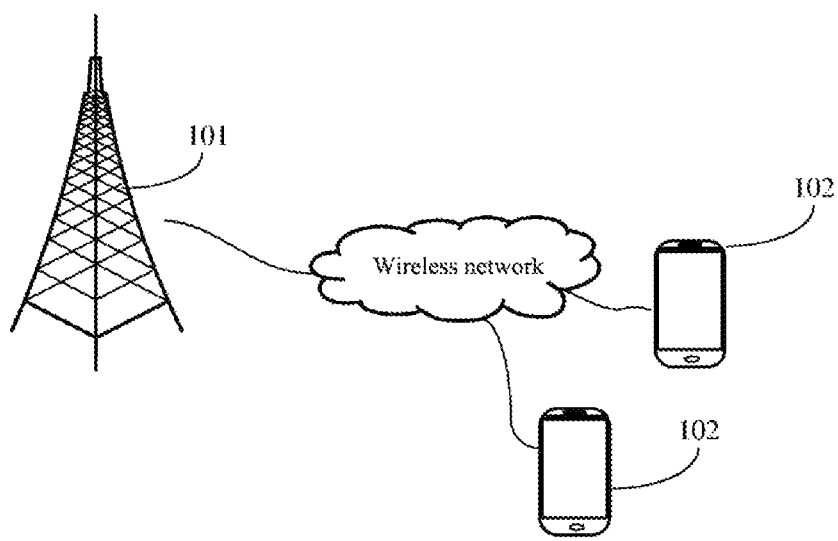
FIG. 1-1 is a schematic diagram of an implementation environment involved in a method for acquiring system information according to some embodiments of the present disclosure.

Reference may be made to FIG. 1-1 which shows a schematic diagram of an implementation environment involved in a method for acquiring system information according to an embodiment of the present disclosure. The implementation environment may include at least one base station 101 and more than one terminal 102.

In a 5G system, the base station 101 may be a next generation Node B (gNB for short). In an LTE system, the base station 101 may be an evolved Node B (eNB for short), and the terminal 102 may be a smartphone, a computer, a multimedia player, an e-reader, wearable equipment, or the like. A connection may be established between the base station 101 and the terminal 102 via a wireless network, and the base station 101 may transmit system information to the terminal 102.

The system information may be transmitted by an MIB and SIBs. The SIBs include SIB1 and other SIB, where SIB1 is a carrier of minimum system information, and other SIB is a carrier of other system information. In the embodiments of the present disclosure, for definitions of the minimum system information and other system information, reference may be made to definitions in the current standard conference.

For example, in the RAN2 #95 conference in August of 2016, the system information in the 5G system may be divided into minimum system information and other system information (including system information which is not required for all terminals), where the minimum system information and other system information are defined respectively as:

"Minimum SI": Minimum SI needs to be broadcasted periodically. Content will at least include information to support cell selection, for acquiring other SI, for accessing the cell.

"Other SI": Other SI comprises everything not broadcasted in minimum SI.

Figures 1, 2:
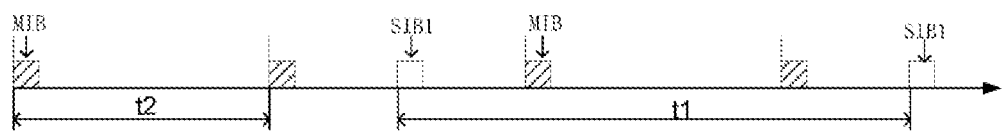
Figure 2:
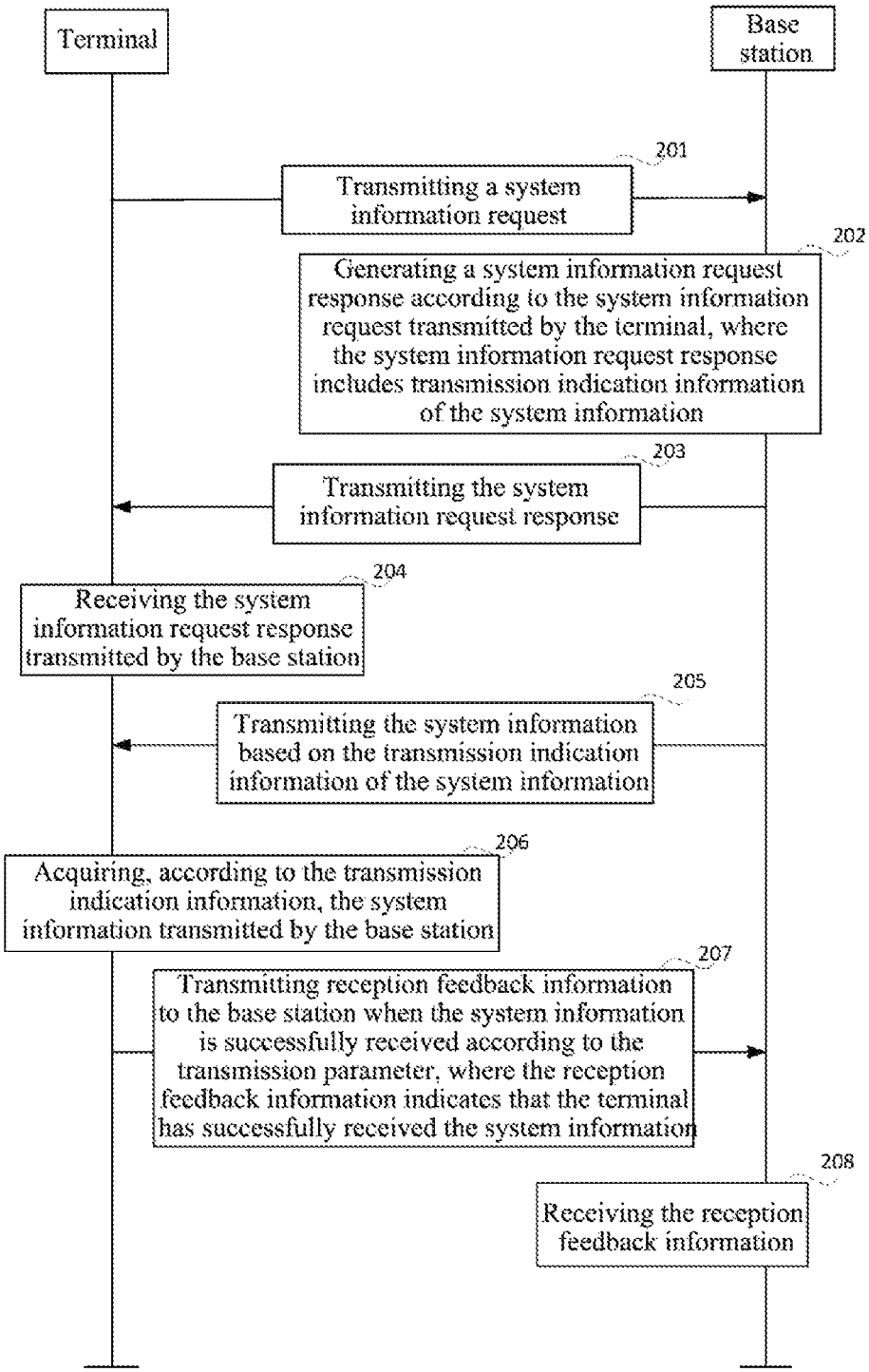

Reference may be made to FIG. 1-2 which is a schematic diagram of a conventional mode for system information transmission, where both the SIBs and the MIB have fixed transmission periods. Generally, scheduling information of other SIB is carried in SIB1 for broadcast. FIG. 1-2 depicts the SIB1 and MIB for schematic description. As shown in FIG. 1-2, SIB1 is periodically transmitted with a time interval of t1, and the MIB is periodically transmitted with a time interval of t2.

However, since the current system information is periodically transmitted, it is likely to cause redundant transmission of unnecessary system information, causing waste of communication resources.

In order to solve the above technical problem, the embodiments of the present disclosure provide a method for acquiring system information, where the method may be related to information during a random access procedure in an LTE system and a derivative system thereof. The random access procedure may also be referred to as a 4-step random access procedure. The 4-step random access procedure includes: (1) a terminal transmits a preamble to a base station, of which a main function is to initiate a random access in uplink information, and perform uplink information synchronization, where the preamble is referred to as message 1 (MSG1 for short); (2) the base station transmits a random access response (RAR for short) to the terminal, of which a main function is to inform synchronization time deviation of the uplink information in downlink information, and configure a resource used for transmission in a subsequent connection establishment procedure, where the RAR is referred to as message 2 (MSG2 for short); (3) the terminal transmits a connection establishment request to the base station, of which a main function is to issue a connection establishment request, where the connection establishment request carries information such as a connection establishment reason and an identification (ID for short) of the terminal, and the connection establishment request is referred to as message 3 (MSG3 for short); and (4) the base station transmits contention resolution information to the terminal, of which a main function is to perform contention resolution, where the connection establishment request response is referred to as message 4 (MSG4 for short).

There are mainly two implementations for the method for acquiring system information as described above. One is that the base station carries transmission indication information in the system information request response transmitted to the terminal, so that the terminal acquires system information according to the transmission indication information; the other is that the base station directly carries system information in the system information request response transmitted to the terminal.

In a first implementation, as shown in FIG. 2, the method for acquiring the system information includes:

Step 201, a terminal transmits a system information request to a base station.

The system information may be minimum system information or other system information, which is not limited in the embodiment of the present disclosure. In an embodiment, the terminal may transmit the system information request to the base station via a physical random access resource, for example, the system request information may be carried by using MSG1 described above.

The system information request may explicitly or implicitly indicate the system information requested by the terminal. The manner in which the system information request explicitly indicates the system information requested by the terminal means that the system information request explicitly indicates, via identification or indication information, the system information requested by the terminal, for example, the system information request may carry identification of the system information that the terminal intends to request. For example, if what the terminal intends to request is other system information SI3, correspondingly, the identification carried in the system information request is 3. The manner in which the system information request implicitly indicates the system information requested by the terminal means that the system information request indirectly indicates, via a specific physical random access channel (PRACH for short), the system information requested by the terminal. That is, different PRACH resources correspond to different system information or different sets of system information (each set of system information includes at least two types of system information), and if the terminal requests corresponding system information, a corresponding PRACH resource plan is employed. For example, if the PRACH resource 1 corresponds to SI1 and the PRACH resource 2 corresponds to SI2, then the terminal uses the PRACH resource 2 to transmit the system information request; that is, it is indicated that the terminal intends to request SI2.

Step 202, the base station generates a system information request response according to the system information request transmitted by the terminal, where the system information request response includes transmission indication information of system information.

The transmission indication information is used to indicate that the terminal acquires, based on the transmission indication information, system information transmitted by the base station. In the embodiment of the present disclosure, the transmission indication information has more than one indication manner, for example, the transmission indication information is used to indicate that the system information is transmitted based on a transmission parameter of the system information carried in the minimum system information, or the transmission indication information is used to indicate that the system information is transmitted based on a pre-configured transmission parameter of the system information, or the transmission indication information is used to indicate a transmission parameter of the system information.

Exemplarily, assuming that the terminal intends to request other system information: SI3, the transmission indication information may indicate that SI1 (that is, the minimum system information) carries a transmission parameter of SI3 and SI3 will be transmitted subsequently based on that transmission parameter.

Alternatively, the transmission indication information may indicate that SI3 will be transmitted according to a pre-configured transmission parameter of the SI3. In this case, the transmission parameter is required to be pre-agreed by the terminal and the base station, and the agreement process may be dynamic or static. Dynamic agreement means that the agreement between the two may be adjusted in real time according to different transmission scenarios. Static agreement means that an agreement between the two will not be adjusted within a specified period of time. The two agreement processes described above may be processes where the transmission parameter is manually configured or processes where the transmission parameter is configured through information interaction, which is not limited in the embodiment of the present disclosure.

Alternatively, the transmission indication information directly indicates a transmission parameter of SI3, for example, the transmission indication information directly carries the transmission parameter, or indicates the transmission parameter by using a pre-agreed indicator. The base station and the terminal may jointly maintain a table of correspondence between the indicator and the transmission parameter. After determining the transmission parameter, the base station may query the table of correspondence to obtain a corresponding indicator, and add the indicator to the transmission indication information. After obtaining the indicator, the terminal may query the table of correspondence to obtain a corresponding transmission parameter.

It should be noted that the transmission parameter may include at least one of the following: a transmission manner, a transmission period, the number of transmission times, a transmission start position, an encoding manner, a resource used for transmission, and an effective transmission duration. Each parameter of the transmission parameters may be arranged in a pre-agreed format.

The transmission manner may represent a manner used when the system information is transmitted, such as a broadcast manner or a unicast manner; the transmission period is used to indicate a duration for which the system information is transmitted once, for example, 5 ms (millisecond); the number of transmission times is used to indicate the number of times the system information is repeatedly transmitted, for example, 2 times; the transmission start position is used to indicate a position where the system information starts to be transmitted; the encoding manner is used to indicate an encoding manner of the system information, for example, using the Turbo encoding manner; the resource used for transmission is used to indicate a resource occupied during transmission of the system information, for example, a certain PRACH resource. It should be noted that the resource used for transmission in the transmission parameter may be a part of resources or all resources, as long as it can be ensured that the terminal can effectively determine, according to the resource used for transmission, a resource occupied during the transmission of the system information for effective information acquisition. The effective transmission duration is used to indicate an effective duration for which the system information is transmitted, that is, the system information transmitted within this duration is effective, and the system information transmitted beyond this duration belongs to ineffective system information, for example, if the system information request response is transmitted based on MSG2, the effective transmission duration may be a duration of an RAR Window of one MSG2, which is 10 ms. In practical use, the base station may also arrange other effective transmission duration, for example, 100 ms.

It should be noted that when the system information request response is transmitted based on MSG2, the transmission parameter may be adapted to MSG2, for example, a repeated transmission of several times at a fixed transmission period in 10 ms, but the base station may also reconfigure the transmission parameter, for example, the transmission period is 100 ms, the number of transmission times is 4, and the number of effective frames or effective slots during the transmission is N. Specific scheduling information may be acquired by reading scheduling information on a physical layer, and the like.

Step 203, the base station transmits a system information request response to the terminal.

In an embodiment, the base station may transmit feedback information for a physical random access resource to the terminal, where the feedback information carries the system information request response. The feedback information may be MSG2 described above.

Step 204, the terminal receives the system information request response transmitted by the base station.

In an embodiment, the terminal receives the feedback information transmitted by the base station for a physical random access resource, where the feedback information carries the system information request response. The feedback information may be MSG2 described above.

Step 205, the base station transmits system information to the terminal based on transmission indication information of the system information.

After the terminal receives the system information request response, since the system information request response carries the transmission indication information, the transmission indication information is acquired by both the terminal and the base station, and both of them reach an agreement. Therefore, the base station may transmit the system information to the terminal based on the transmission indication information.

In practical use, based on different transmission parameters, the manners in which the base station transmits the system information are also different.

When the transmission parameter includes a transmission manner, the base station transmits the system information according to the transmission manner. For example, the terminal intends to request other system information: SI3, and the transmission manner included in the transmission parameter is a broadcast manner, then the base station transmits SI13 in the broadcast manner.

When the transmission parameter includes a transmission period, the base station periodically transmits the system information according to the transmission period. For example, the terminal intends to request other system information: SI2, and the transmission period included in the transmission parameter is 5 ms, then the base station transmits SI12 every 5 ms.

When the transmission parameter includes the number of transmission times, the number of times the base station transmits the system information is equal to that number of transmission times. For example, the terminal intends to request other system information: SI4, and the number of transmission times included in the transmission parameter is 2, then the base station transmits SI4 a total of two times.

When the transmission parameter includes an encoding manner, the base station encodes the system information by using the encoding manner when transmitting the system information. For example, the terminal intends to request minimum system information: SI1, and the encoding manner included in the transmission parameter is the Turbo encoding manner, then the base station encodes SI1 by using the Turbo encoding manner.

When the transmission parameter includes a resource used for transmission, the base station transmits the system information on the resource;

When the transmission parameter includes an effective transmission duration, the base station transmits the system information during the effective transmission duration. For example, the terminal intends to request other system information: SI3, and the effective transmission duration included in the transmission parameter is 10 ms, then the base station transmits SI3 within 10 ms.

It should be noted that, in the foregoing examples, description is made by taking only one of the transmission parameters as an example. In practical use, since the transmission parameter includes at least one of the following: a transmission manner, a transmission period, the number of transmission times, a transmission start position, an encoding manner, a resource used for transmission and an effective transmission duration, therefore, it is necessary to appropriately combine the above-described execution modes according to specific content in the transmission parameter.

For example, the transmission parameter includes: a transmission manner, a transmission period, the number of transmission times, a transmission start position, an encoding manner, a resource used for transmission, and an effective transmission duration. After the base station encodes the system information by using the corresponding encoding manner, the transmission is performed on the corresponding transmission resource in the corresponding transmission manner, at the specified transmission start position on the resource indicated by the transmission parameter, and it is ensured that the system information is transmitted for that number of transmission times with the above transmission period in the effective transmission duration.

For another example, when the transmission parameter includes: a effective transmission duration and a transmission period, after transmitting the system information request response, the base station may repeatedly perform, according to the transmission period, an action of transmitting the system information, and stop transmitting the system information when the effective transmission duration is reached. The timing of the effective transmission duration may start from the time when the base station transmits the system information request response.

For example, assuming that the effective transmission duration is 10 ms, the transmission period is 5 ms, and the number of transmission times is 2, then the base station needs to transmit the system information twice within 10 ms by with a time interval of 5 ms.

Step 206, the terminal acquires, according to the transmission indication information, the system information transmitted by the base station.

Since the terminal and the base station reach an agreement based on the transmission indication information, the terminal may acquire, according to the transmission indication information, the system information transmitted by the base station.

In practical use, based on different transmission parameters, the manners in which the terminal receives the system information are also different.

When the transmission parameter includes a transmission manner, the terminal receives the system information according to the transmission manner. For example, the terminal intends to request other system information: SI3, and the transmission manner included in the transmission parameter is a broadcast mode, then the terminal receives SI3 transmitted by the base station in the broadcast manner.

When the transmission parameter includes a transmission period, the terminal periodically receives the system information according to the transmission period. For example, the terminal intends to request other system information: SI2, and the transmission period included in the transmission parameter is 5 ms, then the terminal receives SI2 transmitted by the base station every 5 ms.

When the transmission parameter includes the number of transmission times, the number of times the terminal receives the system information is less than or equal to that number of transmission times. Generally, the terminal repeatedly performs an action of receiving the system information and stops receiving the system information when the system information is successfully received, or the terminal stops receiving the system information when the number of reception times is equal to the number of transmission times. For example, the terminal intends to request other system information: SI4, and the number of transmission times included in the transmission parameter is 2, then the terminal repeatedly performs an action of receiving SI4 until SI4 is successfully received, or after the action of receiving SI4 is performed twice, the receiving action will be stopped even if SI3 is not successfully received, because the base station does not transmit SI4 anymore.

When the transmission parameter includes an encoding manner, the terminal decodes the system information by using a decoding manner corresponding to the encoding manner. For example, the terminal intends to request minimum system information: SI1, and the encoding manner included in the transmission parameter is a Turbo encoding manner, then the terminal decodes SI1 by using a decoding manner corresponding to the Turbo encoding manner.

When the transmission parameter includes a resource used for transmission, the terminal receives system information on the resource.

When the transmission parameter includes an effective transmission duration, after the system information request response is received, the terminal may repeatedly perform an action of receiving the system information and stop receiving the system information when the system information is successfully received, or stop receiving the system information when a receiving duration reaches the effective transmission duration, where the receiving duration is a duration of performing the receiving action from a time instance when the system information request response is received.

It should be noted that, in the foregoing example, description is made by taking only one of the transmission parameters as an example. In practical use, since the transmission parameter includes at least one of the following: a transmission manner, a transmission period, the number of transmission times, a transmission start position, an encoding manner, a resource used for transmission and an effective transmission duration, it is necessary to appropriately combine the above-described execution modes according to specific content in the transmission parameter.

For example, the transmission parameter includes: a transmission manner, a transmission period, the number of transmission times, a transmission start position, an encoding manner, a resource used for transmission, and an effective transmission duration, then the terminal starts to acquire the system information at the specified transmission start position on the corresponding transmission resource in the corresponding transmission manner, moreover, when the system information is successfully acquired, the receiving duration needs to be no longer than the effective transmission duration, and the number of receiving times needs to be no more than the number of transmission times, furthermore, after the system information is successfully acquired, the system information is decoded by using a corresponding decoding manner.

For another example, when the transmission parameter includes: an effective transmission duration and a transmission period, after receiving the system information request response, the terminal may repeatedly perform an action of receiving the system information according to the transmission period and stop receiving the system information when the system information is successfully received, or stop receiving the system information when a receiving duration reaches the effective transmission duration, where the receiving duration is a duration of performing the receiving action from a time instance when the system information request response is received.

Exemplarily, assuming that the effective transmission duration is 10 ms, the transmission period is 5 ms, and the number of transmission times is 2, then the terminal needs to repeatedly perform the action of receiving the system information within 10 ms with a time interval of 5 ms and stop receiving the system information when the system information is successfully received, or stop receiving the system information when the receiving duration reaches 10 ms, or stop receiving the system information when the number of reception times exceeds 2.

In an embodiment, the foregoing transmission parameter may further include an indication indicating that the terminal requests required system information, and the terminal may transmit, according to the indication, a specified system information request to the base station, where the specified system information request is used for the system information required by the terminal, and the specified system information request may be transmitted explicitly or implicitly.

Step 207, the terminal transmits reception feedback information to the base station when the system information is successfully received according to the transmission parameter, where the reception feedback information indicates that the terminal has successfully received the system information.

In an embodiment, in Step 203 described above, the system information request response may include configuration information of the reception feedback information. The configuration information is used to indicate a feedback condition for the reception feedback information, for example, feedback is only performed when the reception is successful, or the configuration information is used to indicate a transmission resource for the reception feedback information, where the terminal may transmit the reception feedback information on the transmission resource.

It should be noted that, the terminal may retransmit the system information request to the base station when the system information cannot be successfully received according to the transmission parameter, that is, re-perform Step 202 to Step 206 described above to perform effective acquisition of the system information, of which the details will be omitted in the embodiment of the present disclosure.

Step 208, the base station receives the reception feedback information.

It should be noted that, in Step 205, the base station may periodically transmit the system information, that is, the system information may be transmitted more than one time, whereas in Step 206, the terminal does not need to perform the action of receiving the system information again after the system information is successfully received, thus, there may be a case where the terminal has successfully received the system information when the action of receiving the system information is performed for the first time, and the feedback information functions as a corresponding reminder, which may give a reminder to the base station that the terminal has successfully received the system information, so that the base station may stop transmitting the corresponding system information after receiving the feedback information. There is no need to perform the action of transmitting the system information until a next system information request is received, regardless of whether the number of transmission times or the effective transmission duration for the system information meets a requirement included in the transmission parameter, in this way, the waste of resources can be effectively avoided.

For example, the number of transmission times included in the transmission parameter is 3. The base station receives the reception feedback information transmitted by the terminal after it transmits the system information for the first time, the base station's action of stopping transmitting the system information not only ensures successful reception of the system information by the terminal, but also reduces two times of a transmission and reception process of the system information.

It should be noted that, in the method for acquiring system information provided in the embodiments of the present disclosure, the sequential order of the steps may be appropriately adjusted, and the steps may also be correspondingly increased or decreased as appropriate. A method for which a modification can be readily conceived by any person skilled in the art should fall into the scope of the present disclosure, of which the details will omitted herein.

In summary, according to the method for acquiring system information provided in embodiments of the present disclosure, since the base station can transmit the system information request response carrying the transmission indication information according to the system information request from the terminal, the terminal can acquire the system information according to the transmission indication information, and the system information is acquired by the terminal on a targeted basis according to its own needs instead of being periodically transmitted. Therefore, compared with the prior art, redundant transmission of unnecessary information is avoided, and the waste of communication resources is reduced. Moreover, in the embodiments of the present disclosure, the system information request response is transmitted based on MSG2, therefore, signaling multiplexing is achieved, signaling interaction between the terminal and the base station side is effectively reduced, signaling overhead is reduced, and the overall process is simplified.

Figure 3:
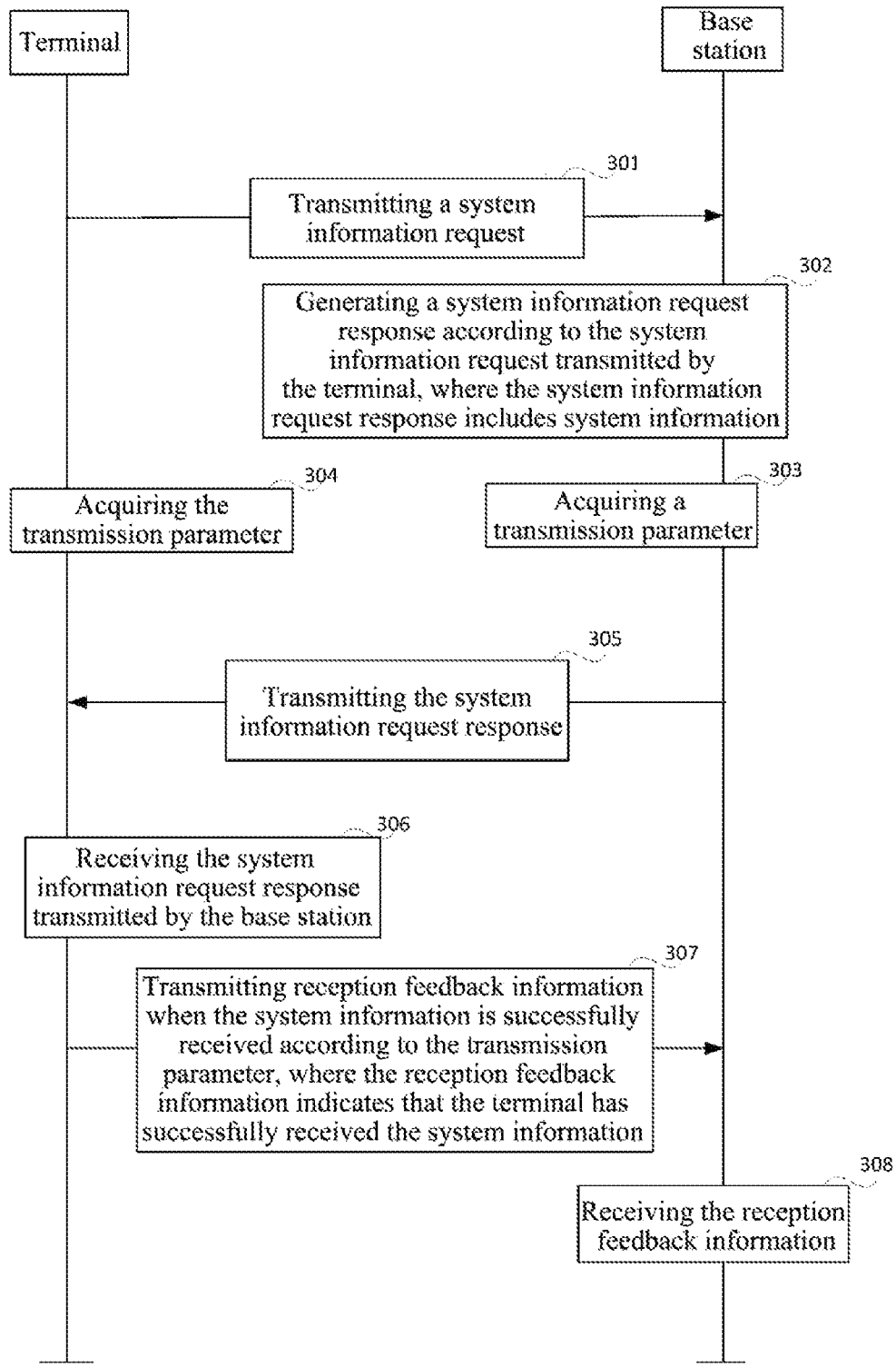
FIG. 3 is a schematic flowchart of another method for acquiring system information according to an embodiment of the present disclosure.

In a second implementation, as shown in FIG. 3, the method for acquiring system information includes:

Step 301, a terminal transmits a system information request to a base station.

The system information may be minimum system information or other system information, which is not limited in the embodiment of the present disclosure.

For this step, reference may be made to Step 201 in the foregoing first implementation, for which details will be omitted in the embodiment of the present disclosure.

Step 302, the base station generates a system information request response according to the system information request transmitted by the terminal, where the system information request response includes system information.

Step 303, the base station acquires a transmission parameter.

In the embodiment of the present disclosure, there is a need to acquire a transmission parameter, so that after the terminal acquires the transmission parameter, a corresponding transmission agreement is reached with the terminal. There may be more than one way to acquire the transmission parameter. Exemplarily, the base station transmits minimum system information including a reconfigured transmission parameter of the system information to the terminal, or the base station transmits minimum system information including a transmission parameter of the system information to the terminal, or the base station acquires a pre-configured transmission parameter of the system information.

The transmission parameter includes at least one of a transmission manner, a transmission period, the number of transmission times, a transmission start position, an encoding manner, a resource used for transmission, and an effective transmission duration.

For definitions of the foregoing transmission parameters, reference may be made to Step 202 in the foregoing first implementation, for which details will be omitted in the embodiment of the present disclosure.

Step 304, the terminal acquires the transmission parameter.

The terminal acquires a reconfigured transmission parameter of the system information using minimum system information transmitted by the base station, or the terminal acquires a transmission parameter of the system information using minimum system information transmitted by the base station, or the terminal acquires a pre-configured transmission parameter of the system information.

Step 305, the base station transmits a system information request response to the terminal.

In an embodiment, the base station may transmit feedback information for a physical random access resource to the terminal, where the feedback information carries the system information request response, and the feedback information may be MSG2 described above.

In an embodiment, the base station may transmit the system information request response to the terminal according to the transmission parameter, for which process reference may be made to the process as described in Step 205 of the forgoing first implementation where the base station transmits the system information to the terminal based on the transmission indication information of the system information, of which details will be omitted in the embodiment of the present disclosure.

Step 306, the terminal receives the system information request response transmitted by the base station.

In an embodiment, the terminal receives, according to the transmission parameter, the system information request response transmitted by the base station, where the system information request response includes the system information. For the process where the terminal receives, according to the transmission parameter, the system information request response transmitted by the base station, reference may be made to the process as described in Step 206 of the forgoing first implementation where the terminal acquires, according to the transmission indication information, the system information transmitted by the base station, for which details will be omitted in the embodiment of the present disclosure.

Exemplarily, the transmission parameter includes: an effective transmission duration and a transmission period, and the system information request response includes the system information, then the process where the terminal receives, according to the transmission parameter, the system information request response transmitted by the base station may include:

after the system information request is transmitted to the base station, the terminal repeatedly performs an action of receiving the system information according to the transmission period until the system information is successfully received, or the terminal stops receiving the system information when a receiving duration reaches the effective transmission duration, where the system information is carried in the system information request response transmitted by the base station based on the system information request, where the receiving duration is a duration of performing the receiving action from a time instance when the system information request is transmitted.

Step 307, the terminal transmits reception feedback information to the base station when the system information is successfully received according to the transmission parameter, where the reception feedback information indicates that the terminal has successfully received the system information.

For this step, reference may be made to Step 207 in the foregoing first implementation, and details will be omitted in the embodiment of the present disclosure.

It should be noted that, reference may be made to Step 305, the terminal may decode the feedback information during a monitoring window of MSG2, but it is possible that the monitoring is not successful. For example, a reason for a failure of detection of a preamble in the PRACH may be interference information in a downlink radio link. This will cause that the terminal cannot successfully receive the system information request response carrying the system information.

When the system information cannot be successfully received according to the transmission parameter, the terminal may retransmit the system information request to the base station, that is, re-perform Step 202 to Step 206 described above to perform effective acquisition of the system information, for which details will be omitted in the embodiment of the present disclosure.

Step 308, the base station receives the reception feedback information.

For this step, reference may be made to Step 208 in the foregoing first implementation, and details will be omitted in the embodiment of the present disclosure.

It should be noted that, in the method for acquiring system information provided in the embodiment of the present disclosure, the sequential order of the steps may be appropriately adjusted, and the steps may also be correspondingly increased or decreased as appropriate. A method for which a modification can be readily conceived by any person skilled in the art within the technical scope disclosed in the present disclosure should fall into the scope of the present disclosure, and therefore details will omitted herein. Moreover, a mutual reference may be made to the first implementation and the second implementation described above according to specific situation.

In summary, according to the method for acquiring system information provided in embodiments of the present disclosure, since the base station can transmit the system information request response carrying the system information according to the system information request from the terminal, the terminal can directly acquire the system information, and the system information is acquired by the terminal on a targeted basis according to its own needs instead of being periodically transmitted. Therefore, compared with the prior art, redundant transmission of unnecessary information is avoided, and the waste of communication resources is reduced. Moreover, in the embodiments of the present disclosure, the system information request response is transmitted based on MSG2, therefore, signaling multiplexing is achieved, signaling interaction between the terminal and the base station side is effectively reduced, signaling overhead is reduced, and the overall process is simplified.

Figures 1, 4:
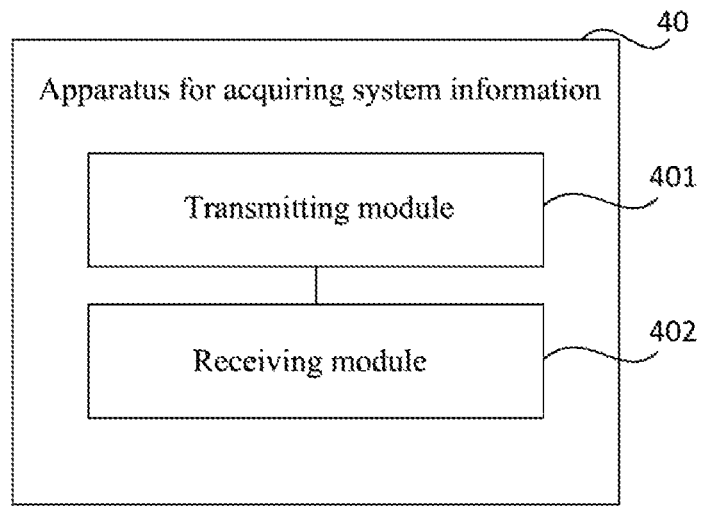
Figures 2, 4:
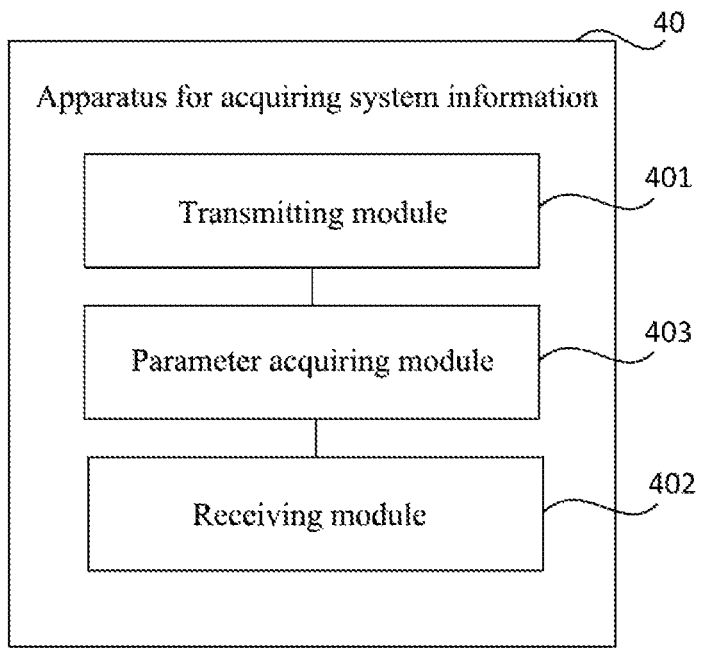
Figures 3, 4:
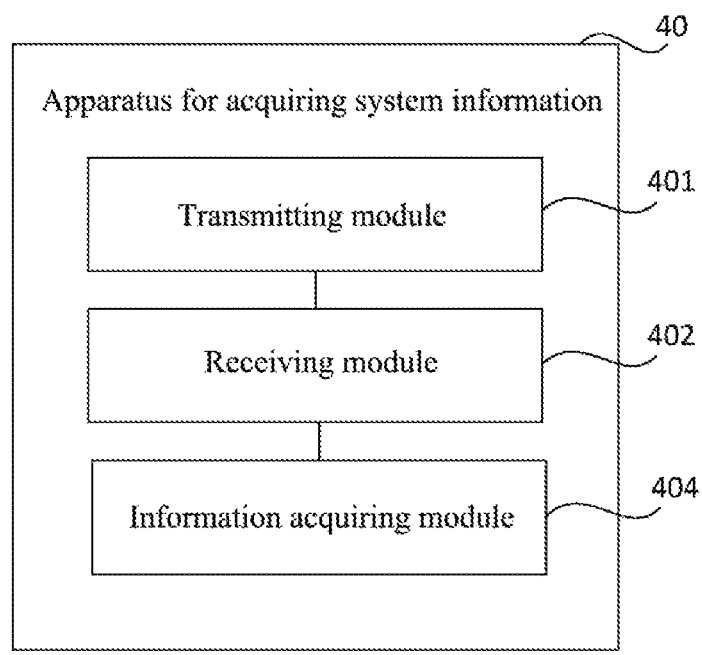
Figure 4:
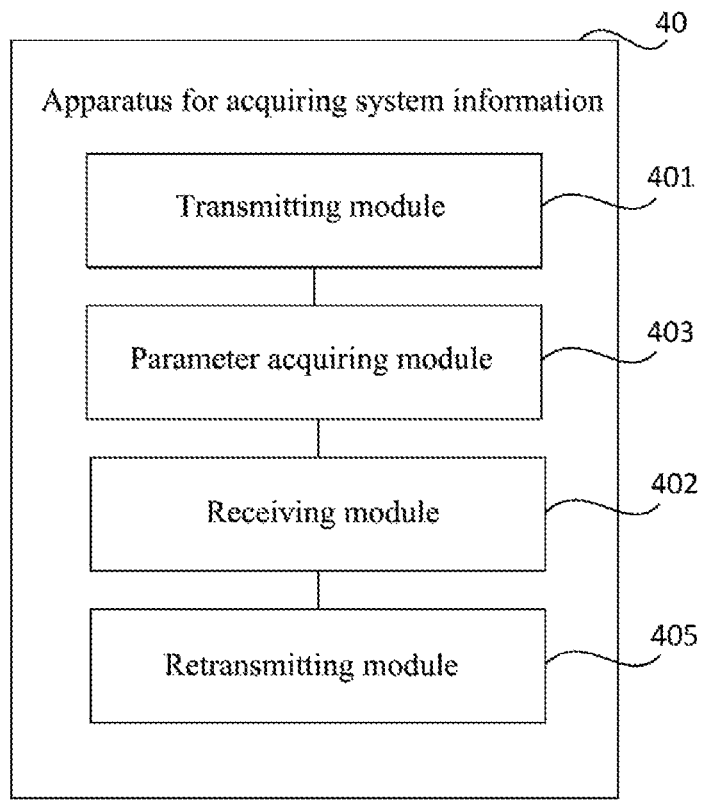

In an embodiment of the present disclosure, an apparatus 40 for acquiring system information is provided, as shown in FIG. 4-1, including:

a transmitting module 401, configured to transmit a system information request to a base station; and a receiving module 402, configured to receive a system information request response transmitted by the base station, where the system information request response includes system information or transmission indication information of the system information;

where the transmission indication information is used to indicate that the system information transmitted by the base station is acquired based on the transmission indication information.

In summary, according to the apparatus for acquiring provided in the embodiment of the present disclosure, since the base station can transmit the system information request response carrying the system information according to the system information request from the terminal, the terminal may directly acquire the system information, and the system information is acquired by the terminal on a targeted basis according to its own needs instead of being periodically transmitted. Therefore, compared with the prior art, redundant transmission of unnecessary information is avoided, and the waste of communication resources is reduced.

In an embodiment, as shown in FIG. 4-2, the apparatus 40 further includes:

a parameter acquiring module 403, configured to: before the system information request response transmitted by the base station is received, acquire a reconfigured transmission parameter of the system information using minimum system information transmitted by the base station, or acquire a transmission parameter of the system information using minimum system information transmitted by the base station, or acquire a pre-configured transmission parameter of the system information;

the receiving module 402 is specifically configured to:

receive, according to the transmission parameter, the system information request response transmitted by the base station, where the system information request response includes the system information.

In an embodiment, the transmission parameter includes: an effective transmission duration and a transmission period, and the system information request response includes the system information, the receiving module 402 is specifically configured to:

after the system information request is transmitted to the base station, repeatedly perform an action of receiving the system information according to the transmission period until the system information is successfully received, or stop receiving the system information when a receiving duration reaches the effective transmission duration, where the system information is carried in the system information request response transmitted by the base station based on the system information request;

where the receiving duration is a duration of performing the receiving action from a time instance when the system information request is transmitted.

In an embodiment, the system information request response includes the transmission indication information of the system information, as shown in FIG. 4-3, the apparatus 40 further includes:

an information acquiring module 404, configured to: after the system information request response transmitted by the base station is received, acquire, according to the transmission indication information, system information transmitted by the base station.

In an embodiment, the transmission indication information is used to indicate that the system information is transmitted based on a transmission parameter of the system information carried in minimum system information, or the transmission indication information is used to indicate that the system information is transmitted based on a pre-configured transmission parameter of the system information, or the transmission indication information is used to indicate a transmission parameter of the system information.

In an embodiment, the transmission parameter includes: an effective transmission duration and a transmission period, and the information acquiring module 404 is specifically configured to:

after the system information request response is received, repeatedly perform an action of receiving the system information according to the transmission period and stop receiving the system information when the system information is successfully received, or stop receiving the system information when a receiving duration reaches the effective transmission duration;

where the receiving duration is a duration of performing the receiving action from a time instance when the system information request response is received.

Figures 4, 5:
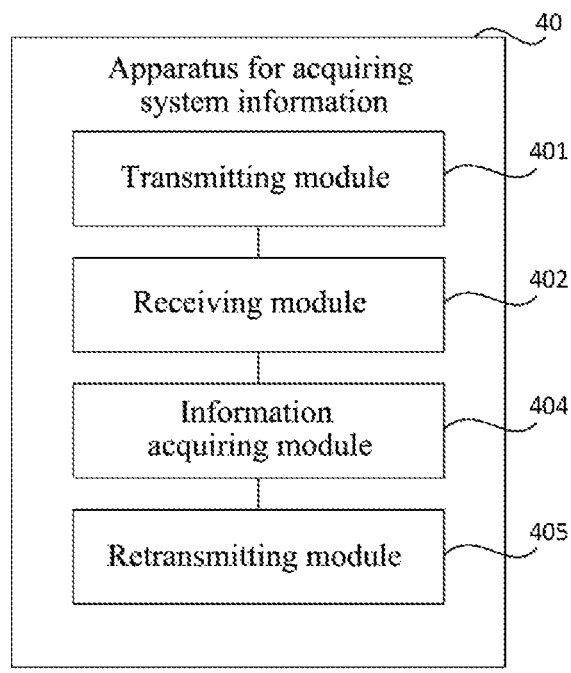

In an embodiment, as shown in FIG. 4-4 and FIG. 4-5, the apparatus 40 further includes:

a retransmitting module 405, configured to: after the system information request response transmitted by the base station is received, retransmit the system information request to the base station when the system information cannot be successfully received according to the transmission parameter.

In an embodiment, as shown in FIG. 4-6 and FIG. 4-7, the apparatus 40 further includes:

a feedback module 406, configured to: after the system information request response transmitted by the base station is received, transmit reception feedback information to the base station when the system information is successfully received according to the transmission parameter, where the reception feedback information indicates that the system information has been successfully received.

In an embodiment, the system information request response includes configuration information of the reception feedback information.

In an embodiment, the transmission parameter includes: at least one of the following: a transmission manner, a transmission period, the number of transmission times, a transmission start position, an encoding manner, a resource used for transmission, and an effective transmission duration.

In an embodiment, the receiving module 402 is specifically configured to:

receive feedback information transmitted by the base station for a physical random access resource, where the feedback information carries the system information request response.

In an embodiment of the present disclosure, another apparatus 50 for acquiring system information is provided, as shown in FIG. 5-1, including:

a generating module 501, configured to generate a system information request response according to a system information request transmitted by a terminal, where the system information request response includes system information or transmission indication information of the system information; where the transmission indication information is used to indicate that the terminal acquires, based on the transmission indication information, the system information transmitted by a base station; and a transmitting module 502, configured to transmit the system information request response to the terminal.

In summary, according to the apparatus for acquiring system information provided in the embodiment of the present disclosure, since the base station can transmit the system information request response carrying system information according to the system information request from the terminal, the terminal can directly acquire the system information, and the system information is acquired by the terminal on a targeted basis according to its own needs instead of being periodically transmitted. Therefore, compared with the prior art, redundant transmission of unnecessary information is avoided, and the waste of communication resources is reduced.

In an embodiment, as shown in FIG. 5-2, the apparatus 50 further includes:

a preprocessing module 503, configured to: before the system information request response to the terminal is transmitted, transmit minimum system information including a reconfigured transmission parameter of the system information to the terminal, or transmit minimum system information including a transmission parameter of the system information to the terminal, or acquire a pre-configured transmission parameter of the system information;

the transmitting module 501 is specifically configured to:

transmit the system information request response to the terminal according to the transmission parameter.

In an embodiment, the system information request response includes transmission indication information of the system information, and the transmitting module 501 is further configured to:

after the system information request response is transmitted to the terminal, transmit the system information to the terminal based on the transmission indication information of the system information.

In an embodiment, the transmission indication information is used to indicate that the system information is transmitted based on a transmission parameter of the system information carried in minimum system information, or the transmission indication information is used to indicate that the system information is transmitted based on a pre-configured transmission parameter of the system information, or the transmission indication information is used to indicate a transmission parameter of the system information.

In an embodiment, as shown in FIG. 5-3, the apparatus 50 further includes:

a receiving module 504, configured to: after the system information request response is transmitted to the terminal, receive reception feedback information transmitted by the terminal, where the reception feedback information indicates that the terminal successfully has received the system information.

In an embodiment, the system information request response includes configuration information of the reception feedback information.

In an embodiment, the transmission parameter includes: at least one of the following: a transmission manner, a transmission period, the number of transmission times, a transmission start position, an encoding manner, a resource used for transmission, and an effective transmission duration.

In an embodiment, the transmitting module 502 is specifically configured to:

transmit feedback information for a physical random access resource to the terminal, where the feedback information carries the system information request response.

In an embodiment of the present disclosure, a system for acquiring system information is provided, including: a terminal and a base station, where the terminal may include the apparatus 40 for acquiring the system information according to any one of FIG. 4-1-FIG. 4-5 described above;

and the base station may include the apparatus 50 for acquiring the system information according to any one of FIG. 5-1-FIG. 5-3 described above.

Figures 4, 5, 6:
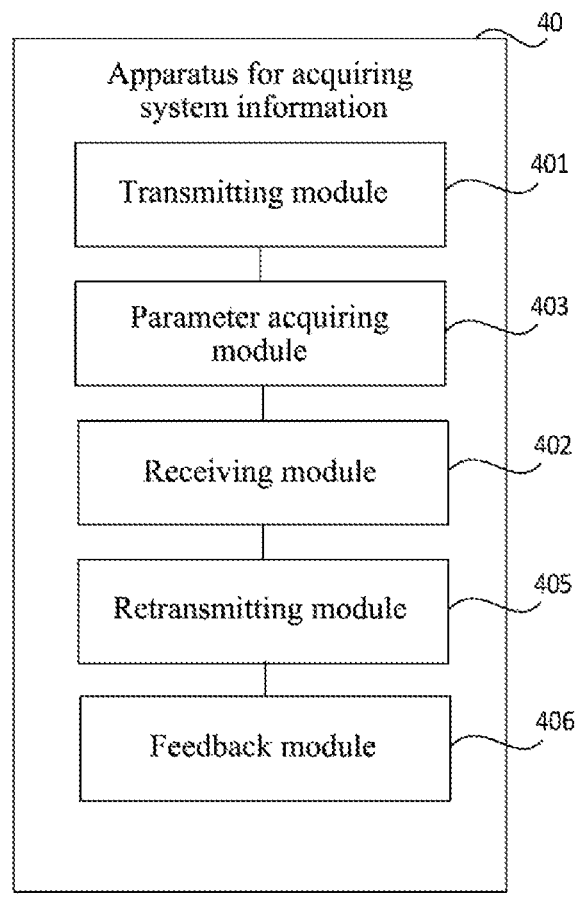
Figures 4, 5, 6, 7:
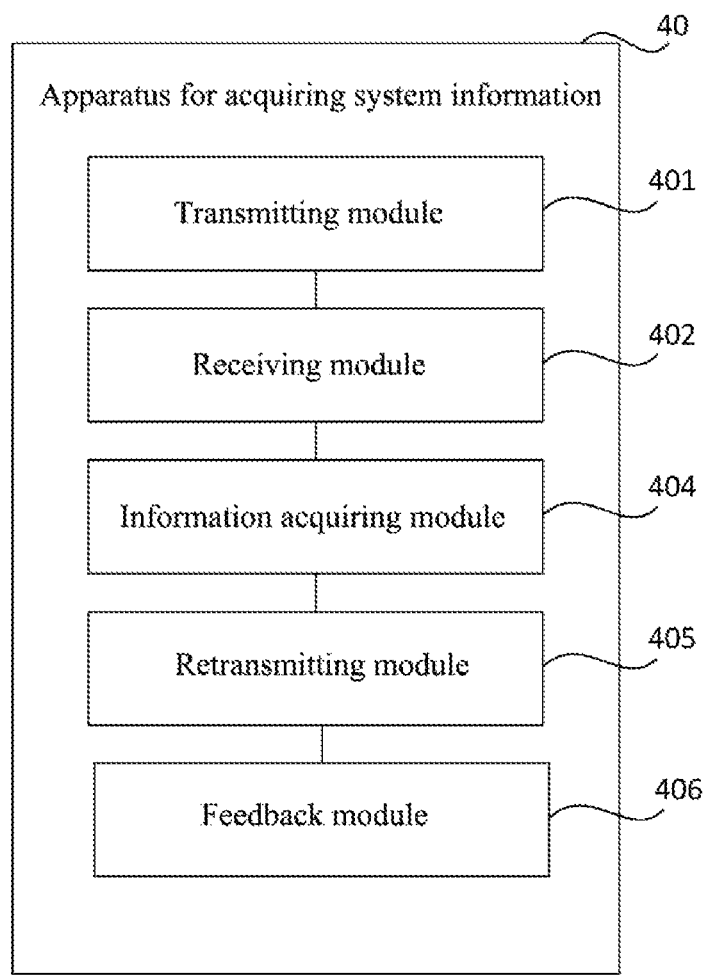
Figures 1, 5:
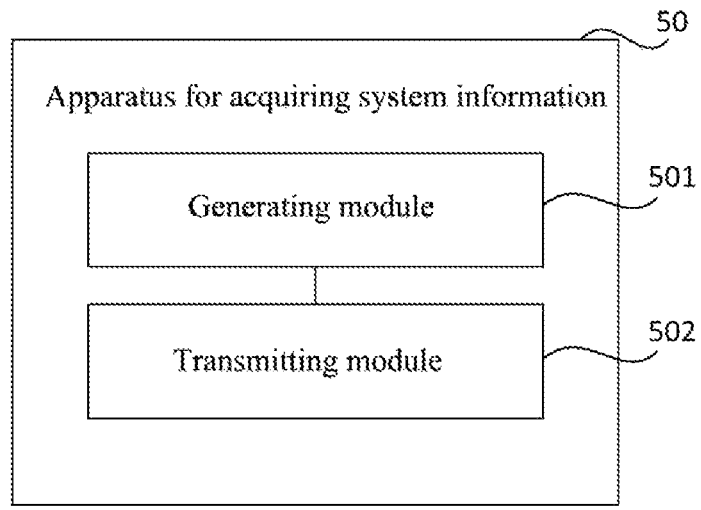
Figures 2, 5:
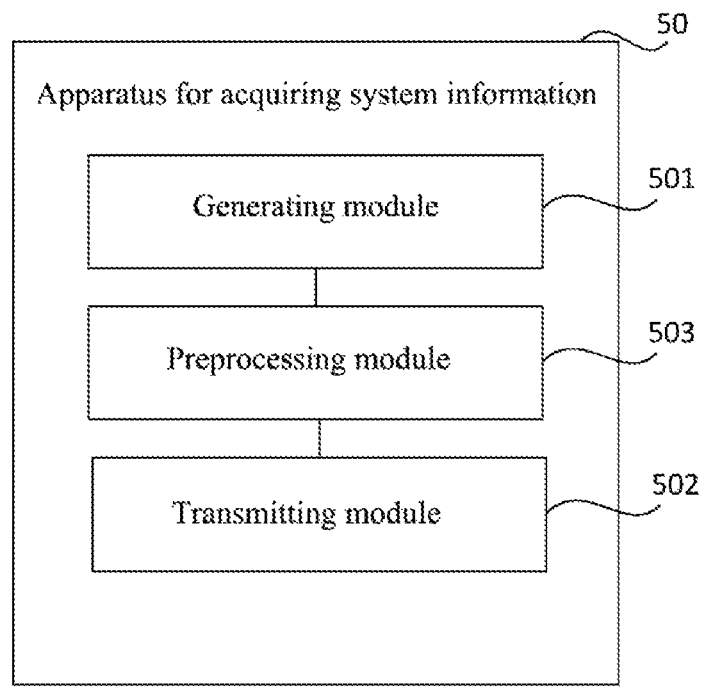
Figures 3, 5:
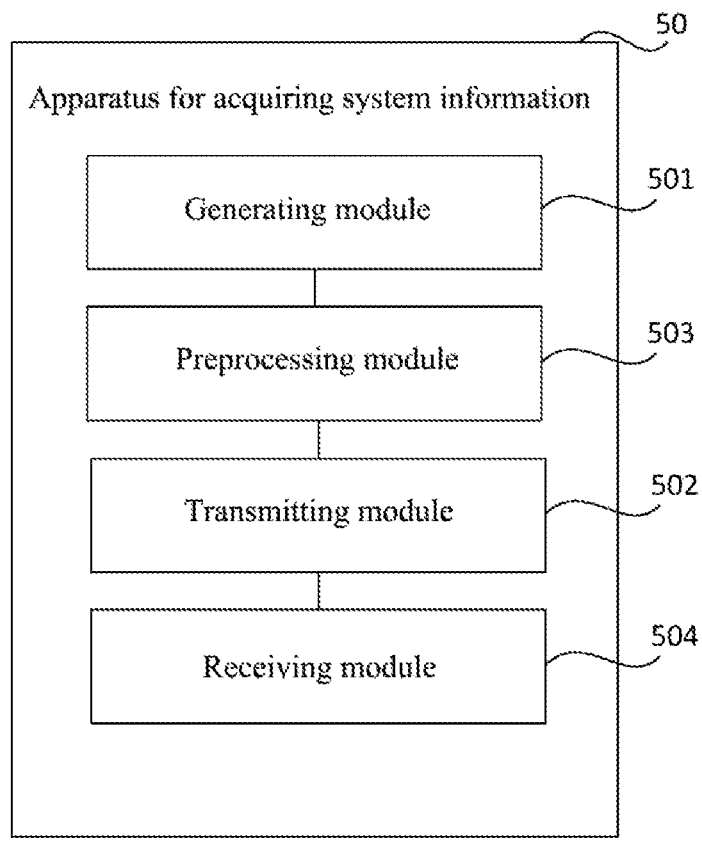
Figure 6:
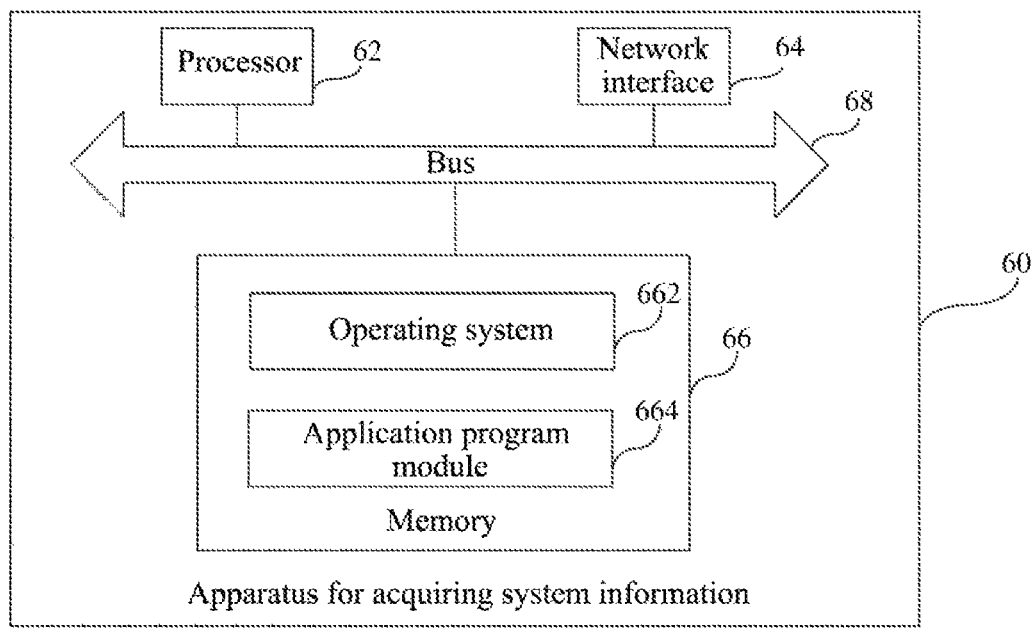

Reference may be made to FIG. 6 which shows a schematic structural diagram of a apparatus 60 for acquiring system information according to an exemplary embodiment of the present disclosure. The apparatus 60 for acquiring system information may be the terminal 40 or the base station 50 described above, and the apparatus 60 for acquiring the system information includes a processor 62 and a network interface 64.

The processor 62 includes one or more processing cores. The processor 62 executes various functional applications and data processing by running a software program and a module.

There may be more than one network interface 64 configured to communicate with other storage equipment or network equipment.

In an embodiment, the apparatus 60 for acquiring system information further includes components such as a memory 66, a bus 68. The memory 66 and the network interface 64 are connected to the processor 62 via the bus 68, respectively.

The memory 66 may be configured to store a software program and a module. Specifically, the memory 66 may store an operating system 662, and an application program module 664 required for at least one function. The operating system 662 may be an operating system such as Real Time eXecutive (RTX), LINUX, UNIX, WINDOWS, OS X or the like.

In some embodiments, when the apparatus 60 for acquiring system information is the base station 50, the network interface 64 may be a transceiving antenna (which may also be considered as a transmitter and a receiver), and the application program module 664 stored in the memory 66 may perform Step 202, Step 203, Step 205, Step 208, Step 302, Step 303, Step 305, Step 308 and the like as described above.

When the apparatus 60 for acquiring system information is the terminal 40, the network interface 64 may be a transceiving antenna (which may also be considered as a transmitter and a receiver), and the application program module 664 stored in the memory 66 may perform Step 201, Step 204, Step 206, Step 207, Step 301, Step 304, Step 306, Step 307 and the like as described above.

It may be clearly understood by a person skilled in the art that, for the purpose of convenient and brief description, reference may be made to corresponding processes in the foregoing method embodiments for detailed working processes of the foregoing systems, apparatuses, and modules, for which details will be omitted herein.

Those of ordinary skill in the art will appreciate that all or a part of the steps carried in the above method embodiments may be implemented by hardware or by a program instructing related hardware, and the program may be stored in a computer readable storage medium. The storage medium mentioned above may be a read only memory, a magnetic disk or an optical disk or the like.

The above descriptions are merely preferred embodiments of the present disclosure, but not intended to limit the present disclosure. Any amendment, equivalent replacement, and improvement within the spirit and the principle of the present disclosure shall fall into the scope of the present disclosure.

What is claimed is:

1. A method for acquiring system information, comprising:

transmitting, by a terminal, a system information request to a base station;

receiving, by the terminal, a system information request response transmitted by the base station, wherein the system information request response comprises transmission indication information of system information; wherein the transmission indication information is used to indicate that the terminal acquires, based on the transmission indication information, the system information transmitted by the base station; and acquiring, by the terminal, according to the transmission indication information, the system information transmitted by the base station;

wherein the transmission indication information is used to indicate that the system information is transmitted based on a pre-configured transmission parameter of the system information, or the transmission indication information is used to indicate a transmission parameter of the system information;

wherein the transmission parameter comprises: an effective transmission duration and a transmission period, the acquiring, by the terminal, according to the transmission indication information, the system information transmitted by the base station comprises:

after the system information request response is received, repeatedly performing, by the terminal, an action of receiving the system information according to the transmission period and stopping receiving the system information when the system information is successfully received, or the terminal stopping receiving the system information when a receiving duration reaches the effective transmission duration:

wherein the receiving duration is a duration of performing the receiving action from a time instance when the system information request response is received.

2. The method according to claim 1, after the receiving, by the terminal, the system information request response transmitted by the base station, further comprising:
retransmitting, by the terminal, the system information request to the base station when the system information cannot be successfully received according to the transmission parameter.

3. The method according to claim 1, after the receiving, by the terminal, the system information request response transmitted by the base station, further comprising:
transmitting, by the terminal, reception feedback information to the base station when the system information is successfully received according to the transmission parameter, wherein the reception feedback information indicates that the terminal has successfully received the system information.

4. The method according to claim 1, wherein the transmission parameter further comprises at least one of the following: a transmission manner, a number of transmission times, a transmission start position, an encoding manner, and a resource used for transmission.

5. The method according to claim 1, wherein,
the receiving, by the terminal, the system information request response transmitted by the base station comprises:
receiving, by the terminal, feedback information transmitted by the base station for a physical random access resource, wherein the feedback information carries the system information request response.

6. An apparatus for acquiring system information, comprising:
a processor and a network interface, wherein the network interface is configured to:
transmit a system information request to a base station; and
receive a system information request response transmitted by the base station, wherein the system information request response comprises transmission indication information of system information; wherein the transmission indication information is used to indicate that the system information transmitted by the base station is acquired based on the transmission indication information;
wherein the processor is configured to:
after the system information request response transmitted by the base station is received, acquire, according to the transmission indication information, the system information transmitted by the base station;
wherein the transmission indication information is used to indicate that the system information is transmitted based on a pre-configured transmission parameter of the system information, or the transmission indication information is used to indicate a transmission parameter of the system information;
wherein the transmission parameter comprises: an effective transmission duration and a transmission period, and the network interface is further configured to:
after the system information request response is received, repeatedly perform an action of receiving the system information according to the transmission period and stop receiving the system information when the system information is successfully received, or stop receiving the system information when a receiving duration reaches the effective transmission duration,
wherein the receiving duration is a duration of performing the receiving action from a time instance when the system information request response is received.

7. The apparatus according to claim 6, wherein the network interface is further configured to:
after the system information request response transmitted by the base station is received, retransmit the system information request to the base station when the system information cannot be successfully received according to the transmission parameter.

8. The apparatus according to claim 6, wherein the network interface is further configured to:
after the system information request response transmitted by the base station is received, transmit reception feedback information to the base station when the system information is successfully received according to the transmission parameter, wherein the reception feedback information indicates that the system information has been successfully received.

9. The apparatus according to claim 6, wherein the transmission parameter further comprises at least one of the following: a transmission manner, a number of transmission times, a transmission start position, an encoding manner, and a resource used for transmission.

10. The apparatus according to claim 6, wherein the network interface is further configured to:
receive feedback information transmitted by the base station for a physical random access resource, wherein the feedback information carries the system information request response.

* * * * *